(12) United States Patent
Kawahara et al.

(10) Patent No.: US 7,703,045 B1
(45) Date of Patent: Apr. 20, 2010

(54) METHOD AND APPARATUS FOR INTERACTING WITH OBJECTS IN A USER INTERFACE

(75) Inventors: Hideya Kawahara, Mountain View, CA (US); Paul Byrne, Los Altos, CA (US); Frank E. Ludolph, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 499 days.

(21) Appl. No.: 11/516,321

(22) Filed: Sep. 5, 2006

(51) Int. Cl.
*G06F 3/048* (2006.01)
*G06F 3/00* (2006.01)

(52) U.S. Cl. ............... 715/853; 715/769; 715/770; 715/854

(58) Field of Classification Search ........... 715/853, 715/852, 764, 769, 770; 707/102
See application file for complete search history.

(56) References Cited

U.S. PATENT DOCUMENTS

| | | | |
|---|---|---|---|
| 2001/0045952 A1* | 11/2001 | Tenev et al. | 345/440 |
| 2005/0131924 A1* | 6/2005 | Jones | 707/100 |
| 2006/0212835 A1* | 9/2006 | Bobrow et al. | 715/853 |
| 2007/0234237 A1* | 10/2007 | Seemann | 715/853 |

* cited by examiner

*Primary Examiner*—Kieu Vu
*Assistant Examiner*—Andrea Leggett
(74) *Attorney, Agent, or Firm*—Park, Vaughan & Fleming LLP

(57) ABSTRACT

A system that interacts with objects in a user interface of a computer system. During operation, the system receives a selection of an object displayed within the user interface from a user, wherein the selected object contains a plurality of sub objects. In response to the selection, the system determines whether the user is moving the selected object with a specified motion. If so, the system performs a transformation on the selected object, wherein the transformation is associated with the specified motion.

17 Claims, 15 Drawing Sheets

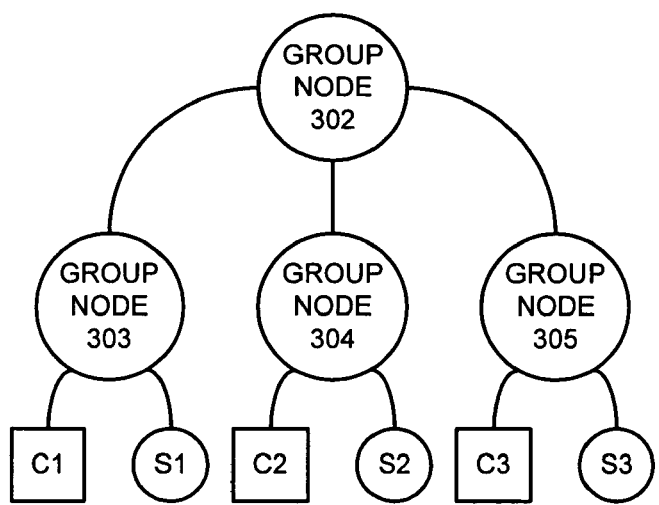
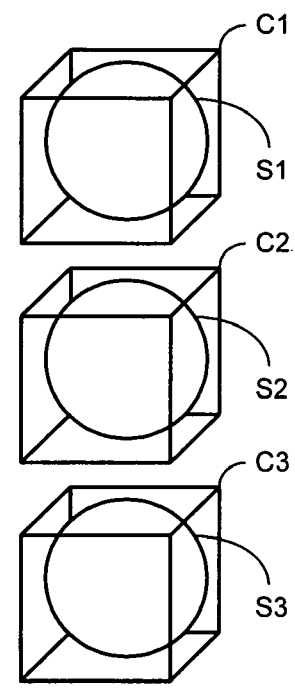
FIG. 3A    FIG. 3B

METHOD AND APPARATUS FOR INTERACTING WITH OBJECTS IN A USER INTERFACE

BACKGROUND

1. Field of the Invention

The present invention relates to techniques for interacting with objects in a user interface. More specifically, the present invention relates to a method and apparatus that facilitates disengaging sub-objects from an object within a user interface.

2. Related Art

Advances in semiconductor technology have led to the development of more powerful graphics co-processors. These more powerful graphics co-processors provide advanced graphics capabilities that can quickly render complex two-dimensional (2D) and three-dimensional (3D) objects. By taking advantage of these advanced graphics capabilities, a rich user interface (UI) can be developed. For example, some existing UIs use 3D-rendering techniques to present objects in 3D. In these UIs, objects such as windows or icons can be rotated in three dimensions to make room for other objects being displayed in the UI. Another example involves using 3D-animation effects, such as rotating an icon about one of its axes, to indicate that an application associated with the icon requires attention from the user.

3D objects are often represented by scene graphs. A scene graph typically comprises a tree data structure which is used to represent a set of graphical objects. Scene graphs are often used in 2D-rendering systems, but are becoming more popular in advanced 3D-rendering systems.

Moreover, scene graphs provide a mechanism to represent a hierarchy of sub-objects, which are grouped together to form composite objects. For example, a car object can be composed of a frame, doors, hubs, tires, and lug nuts. Similarly a tire, a hub, and lug nuts can be grouped together to form a wheel object. These scene graphs are described in more detail below.

One problem with existing UIs that manipulate hierarchies of graphical objects is the ambiguity that arises when a user places a cursor on top of an object that contains multiple sub-objects. In this case, the user may be expressing a desire to select one of many sub-objects or group of sub-objects for the object. For example, consider a model for a car. If the user places the cursor over one of the tires, it can mean the user wants to select: (1) the entire car, (2) the tire, (3) the hub, or (4) the exact lug nut to which the cursor is pointing on the tire.

3D-modeling applications typically provide a mechanism that allows the user to select a sub-object or a group of sub-objects. For example, sub-objects or a group of sub-objects can be selected by using a combination of keyboard and mouse operations. (Note that selecting the specified sub-object or a group of sub-objects in the UI implicitly involves selecting a sub-tree of the scene graph that corresponds to the sub-object or the group of sub-objects.) However, performing such a combination of keyboard and mouse operations is burdensome.

Hence, what is needed is a method and an apparatus for interacting with a user interface without the problems described above.

SUMMARY

One embodiment of the present invention provides a system that interacts with objects in a user interface of a computer system. During operation, the system receives a selection of an object displayed within the user interface from a user, wherein the selected object contains a plurality of sub-objects. In response to the selection, the system determines whether the user is moving the selected object with a specified motion. If so, the system performs a transformation on the selected object, wherein the transformation is associated with the specified motion.

In a variation on this embodiment, the selected object is represented by a sub-tree of a scene graph, and the sub-objects of the selected object are represented by branches or leaf nodes of the sub-tree.

In a further variation, a link between two objects in the scene graph has a strength property which indicates the strength of the link between the two objects.

In a further variation, the strength property is determined by analyzing parameters and conditions of the two objects which the link is coupling. The parameters and the conditions can include: a parent-child relationship, the distance from the root of the scene graph, the size of the sub-tree, and mass parameters associated with the related sub-trees.

In a further variation, if the specified motion involves shaking the selected object, while performing the transformation on the selected object, the system identifies a weakest branch of the sub-tree for the selected object, wherein the weakest branch is associated with a weakest link of the sub-tree. The system then disengages sub-objects in the weakest branch from the selected object.

In a further variation, each time the selected object is shaken, the system disengages sub-objects in the next-weakest-branch of the sub-tree.

In a further variation, while disengaging a given sub-object, the system moves the given sub-object away from the selected object within the user interface.

In a further variation, if the given sub-object is moved within a specified distance from a second object or within a specified area in the second object which can receive the given sub-object, a visual indication is applied to the given sub-object and/or the second object which indicates that the given sub-object can be dropped onto the second object. In one embodiment of the present invention, the visual indication includes: a warping of the given sub-object toward the specified area in the second object that can receive the given sub-object, a warping of the specified area in the second object toward the given sub-object, a slight movement of the given sub-object toward the specified area, a slight movement of the specified area toward the given sub-object, a highlighting of the given sub-object, and a highlighting of the specified area.

In a further variation, if the user releases the selected object, the disengaged sub-objects return to previous positions relative to the selected object.

In a further variation, if the user drops a disengaged sub-object onto a second object which can receive the disengaged sub-object, the disengaged sub-object is incorporated into the second object.

In a further variation, if the specified motion involves dragging the selected object, while performing the transformation on the selected object, the system identifies a weakest branch of the sub-tree for the selected object, wherein the weakest branch is associated with a weakest link of the sub-tree. Next, the system disengages the sub-objects in the weakest branch from the selected object. The system then moves the sub-objects in the weakest branch to a position within the user interface specified by the user.

BRIEF DESCRIPTION OF THE FIGURES

FIG. 3A illustrates an exemplary scene graph in accordance with an embodiment of the present invention.

FIG. 3B illustrates a corresponding 3D output generated from the scene graph in accordance with an embodiment of the present invention.

DETAILED DESCRIPTION

Figure 1A:
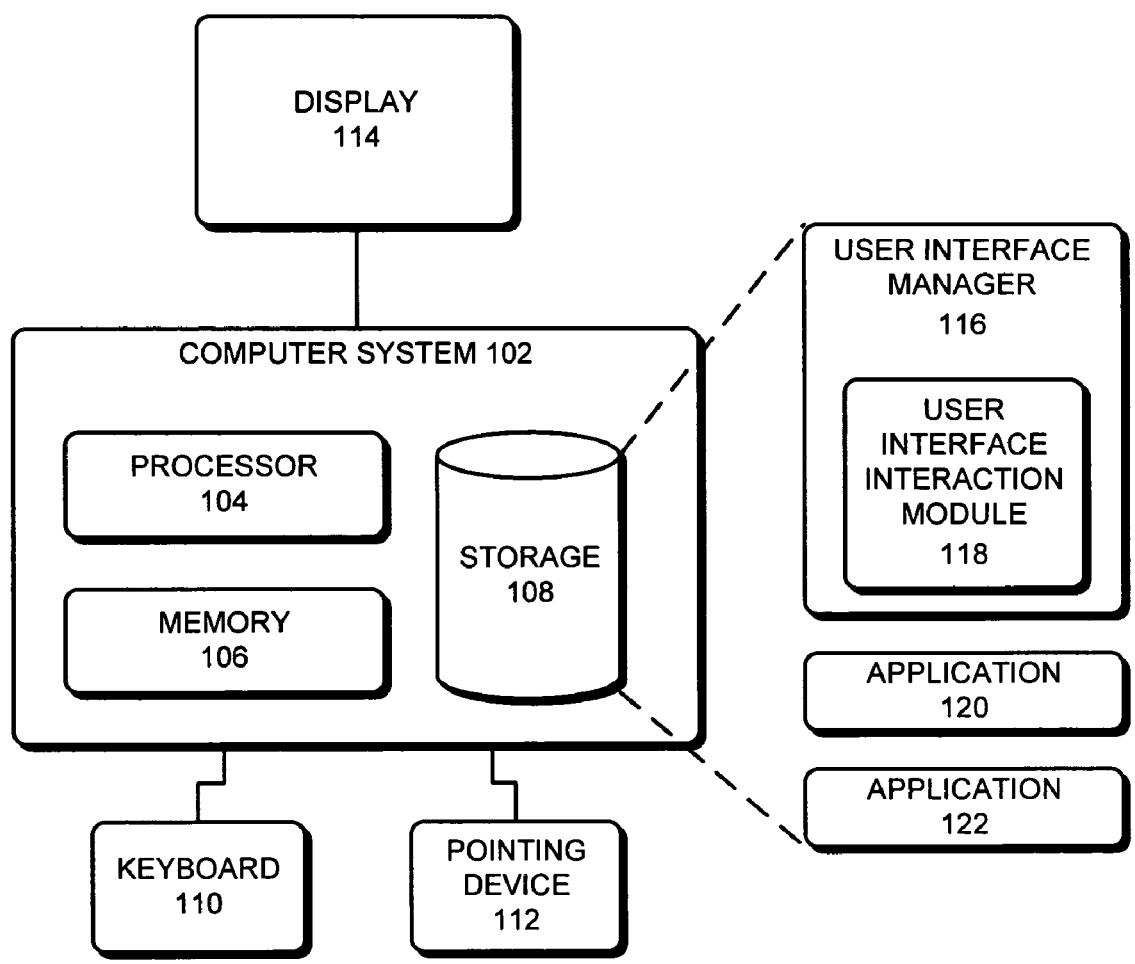
FIG. 1A presents a block diagram of a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention allows a user to select a sub-object of an object using a pointing-device and a specified motion (i.e., a specified gesture) of the selected sub-object. (Note that a gesture can be a specific motion of the pointing device.)

In one embodiment of the present invention, when a user starts dragging a selected object, the dragged object and the sub-tree of the scene graph that includes the selected object are identified. For example, the selected object can be identified using a 3D-ray picking technique.

In one embodiment of the present invention, a user interface interaction module detects gestures or motions that a user performs while dragging the selected object. This gesture or the motion can include, but is not limited to, a shaking of the selected object or a specific movement of the selected object (e.g., in a "V" pattern).

In one embodiment of the present invention, when the user drags an object in the user interface, the system identifies the weakest branch of the sub-tree for the selected object, wherein the weakest branch is associated with a weakest link of the sub-tree of the scene graph for the dragged object. The system then moves the sub-objects associated with sub-tree of the dragged object. In one embodiment of the present invention, the weakest link is determined by an application displaying the selected object. For example, the application can determine that the weakest link is the link coupling the parent of the selected object to other nodes in the scene graph. The application can then determine that the link coupling the selected object to the parent object is the next-weakest link, followed by the links coupling the selected object to child objects of the selected object. Note that this hierarchy of link strength is used only for illustration purposes and is not meant to limit the present invention to the hierarchy of link strength presented in this example.

Note that although the discussion below refers to the act of disengaging a sub-object from a selected object, the present invention can also be applied to an object that has no sub-objects. For example, if a model of a car contains no sub-objects, shaking the car does not disengage any sub-objects. Instead, the car itself is moved as a whole.

In one embodiment of the present invention, each time the user shakes the pointing device, the system changes the point where the drag of the selected object occurs. For example, the system can start moving the sub-tree of the scene graph from the second weakest link, then from the third weakest link, then from the fourth weakest link, etc. For example, consider a model of a car which includes a sequence of linked objects in the following order: car, tire, hub, and lug nuts. While using the pointing device to drag the car, each time the user shakes the pointing device, the sub-objects of the car are disengaged in the following order: car, tire, hub, and lug nuts.

In one embodiment of the present invention, a link between two objects in the scene graph has a strength property which indicates the strength of the link between the two objects. In one embodiment of the present invention, the strength property is determined by analyzing parameters and conditions of the two objects to which the link is coupling. In another embodiment of the present invention, the parameters and the conditions can include: a parent-child relationship, the distance from the root of the scene graph, the size of the sub-tree, and mass parameters associated with the related sub-trees.

In one embodiment of the present invention, if the user stops shaking an object, the sub-objects associated with the object return to their previous positions. In one embodiment of the present invention, the system uses a physics model to cause a disengaged sub-object to return to its previous position. For example, the system can use a spring-damper model to couple sub-objects to an object. When the user stops shaking the object, the disengaged sub-objects are pulled back to their natural resting positions by the springs-damper model.

In one embodiment of the present invention, if the user drops the disengaged sub-object of a first object onto a second object that can receive the disengaged sub-object, the second object receives the sub-object.

Computer System

FIG. 1A presents a block diagram of computer system 102 in accordance with an embodiment of the present invention. Computer system 102 can generally include any type of computer system, including, but not limited to, a computer system based on a microprocessor, a mainframe computer, a digital signal processor, a portable computing device, a personal organizer, a device controller, and a computational engine within an appliance.

Computer system 102 includes processor 104, memory 106, and storage device 108. Processor 104 can generally include any type of processor, including, but not limited to, a microprocessor, a mainframe computer, a digital signal processor, a personal organizer, a device controller and a computational engine within an appliance. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

A user interacts with computer system 102 through keyboard 110 and pointing device 112. Pointing device 112 can include, but is not limited to, a mouse, a trackball, a pen, and a stylus. Computer system 102 is coupled to display 114, which displays a user interface to the user.

Storage device 108 contains user interface manager 116 and applications 120-122. User interface manager 116 includes user interface interaction module 118, which is described in more detail in reference to FIGS. 1B, 4A-7B below. Note that user interface manager 116 may or may not be contained within computer system 102. For example, user interface manager 116 can be contained in a server coupled to computer system 102 through a network.

Figure 1B:
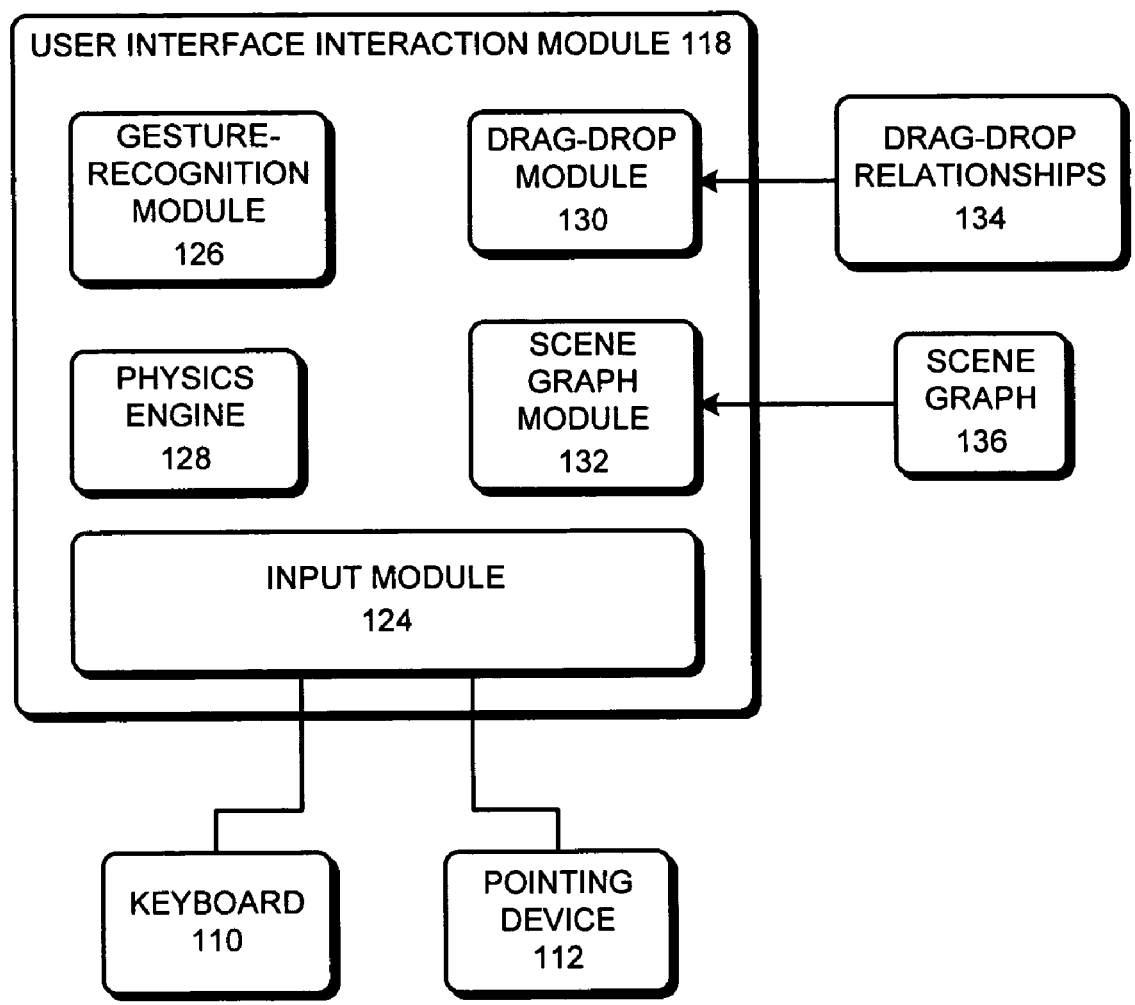
FIG. 1B presents a block diagram of a user interface interaction module in accordance with an embodiment of the present invention.

FIG. 1B presents a block diagram of user interface interaction module 118 in accordance with an embodiment of the present invention. User interface interaction module 118 includes input module 124, gesture-recognition module 126, physics engine 128, drag-drop module 130, and scene graph module 132.

Commands sent by a user from keyboard 110 and pointing device 112 are received at input module 124. Gesture-recognition module 126 interprets these commands and determines if a user is moving a selected object in a specified motion or a specified gesture. If so, gesture-recognition module 126 performs a transformation on the selected object that corresponds to the specified motion. For example, if the specified motion is a shaking of the selected object, gesture-recognition module 126 can cause one or more sub-objects to be disengaged from the selected object.

If the user moves the disengaged sub-objects (or moves the selected object if no gesture was received, or if the selected object does not contain sub-objects), physics engine 128 applies forces to the disengaged sub-objects (or to the selected object) so that when the disengaged sub-objects are released, the disengaged sub-objects are attracted to a point on an object within the UI which can receive the disengaged sub-object. In one embodiment of the present invention, physics engine 128 applies forces to the mesh on which an object is situated.

Drag-drop module 130 uses drag-drop relationships 134 to determine whether a sub-object that was disengaged from a first object (or the selected object if the selected object does not contain any sub-objects) can be dropped onto a second object. If so, drag-drop module 130 causes physics engine 128 to apply a force to the disengaged sub-object to indicate that the disengaged sub-object can be dropped onto the second object.

Scene graph module 132 receives scene graph 136, which describes the grouping of objects and the relationship between objects present in the user interface.

Scene Graphs

Figure 2:
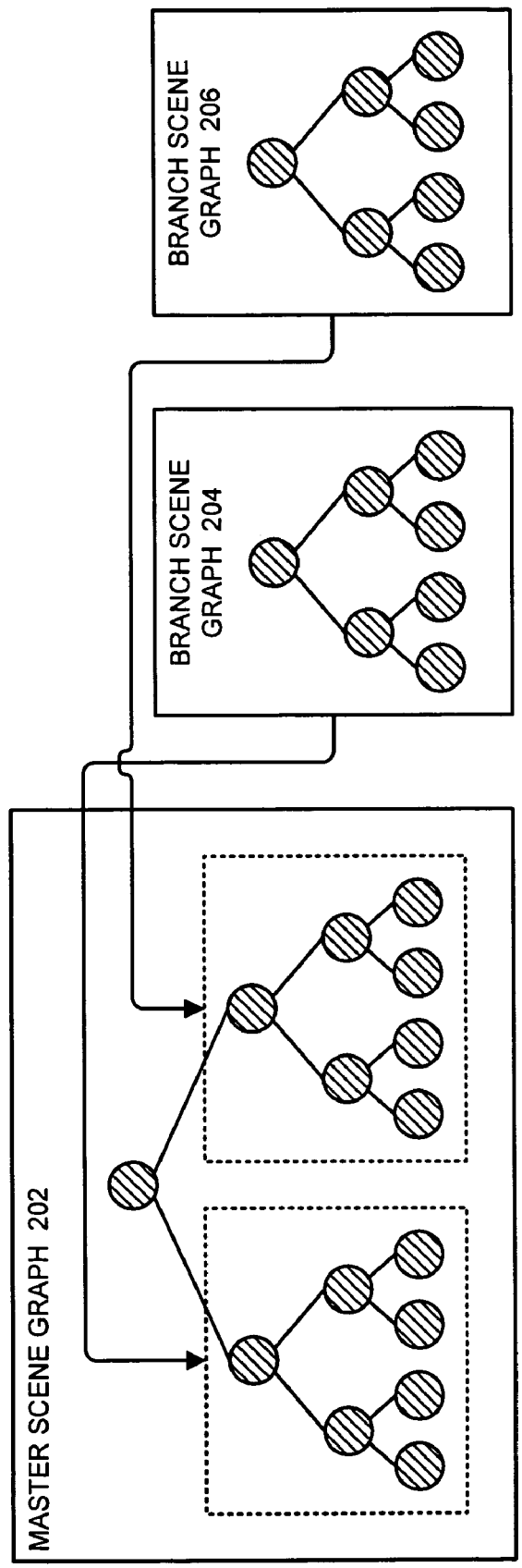
FIG. 2 illustrates how a user interface manager interacts with scene graphs for various applications in accordance with an embodiment of the present invention.

FIG. 2 illustrates how the scene graph module 132 interacts with scene graphs for various applications in accordance with an embodiment of the present invention. As is illustrated in FIG. 2, scene graph module 132 maintains a master scene graph 202 that represents an entire scene for display 114.

This master scene graph 202 includes "branch graphs" (also referred to as "sub-graphs" or "sub-trees"), which are generated by client applications 120 and 122. More specifically, client applications 120 and 122 generate corresponding branch graphs 204 and 206, which, for example, can represent user interfaces for client applications 120 and 122. Scene graph module 132 then incorporates these branch graphs 204 and 206 into a master scene graph 202. Note that the process of incorporating branch graphs 204 and 206 into master scene graph 202 can involve manipulating spatial locations and orientations of components within branch graphs 204 and 206, as well as performing other operations on branch graphs 204 and 206. In an alternative embodiment of the present invention, scene graph module 132 maintains branch graphs 204 and 206 in separate data structures, and does not combine them into a single master scene graph 220.

FIG. 3A illustrates an exemplary scene graph 300 in accordance with an embodiment of the present invention. Scene graph 300 includes a number of leaf nodes that represent cubes C1-C3, and a number of leaf nodes that represent spheres S1-S3.

Group nodes 302-305 collectively combine these leaf nodes into a single larger group. More specifically, group node 303 combines leaf nodes C1 and S1 into a first subgroup that represents a sphere within a cube as is illustrated in FIG. 3B. Similarly, group node 304 combines leaf nodes C2 and S2 into a second subgroup that represents a sphere within a cube, and group node 305 combines leaf nodes C3 and S3 into a third subgroup that represents a sphere within a cube. A higher-level group node 302 combines the subgroups for group nodes 303-305 into a single larger group that includes a stack of three spheres within cubes as is illustrated in FIG. 3B.

Note that a scene graph typically defines properties for these graphical components, including color, transparency, location, and transformations such as rotation and scaling. These properties can either be expressed as a special kind of node, or alternatively, can be embedded in a node representing a graphical component. Also note that a scene graph can also include transformation nodes (not shown) which can define transformations for associated sub-graphs.

Figure 4A:
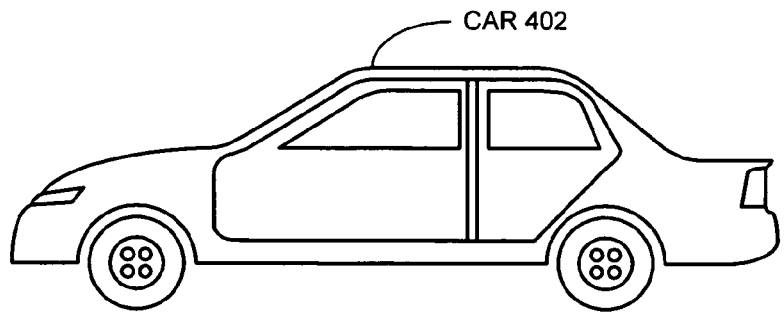
FIG. 4A presents an exemplary object in accordance with an embodiment of the present invention.
Figure 4B:
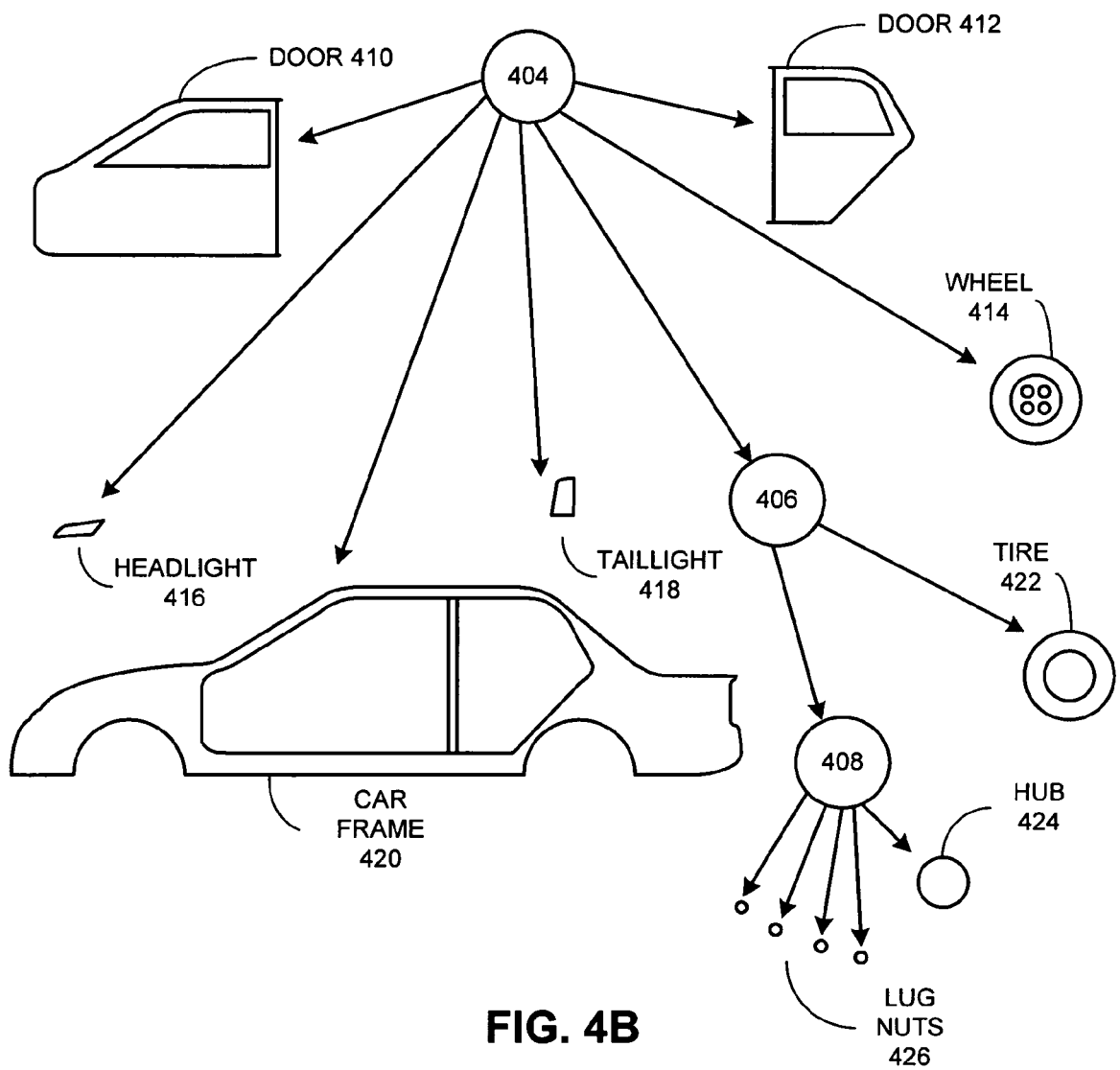
FIG. 4B presents an exemplary scene graph for the exemplary object illustrated in FIG. 4A in accordance with an embodiment of the present invention.

FIG. 4A presents an exemplary object, car 402, in accordance with an embodiment of the present invention. FIG. 4B presents an exemplary scene graph for the exemplary object illustrated in FIG. 4A in accordance with an embodiment of the present invention. The scene graph illustrated in FIG. 4B includes group nodes 404-408. Group node 404 includes six leaf nodes (doors 410 and 412, wheel 414, headlight 416, taillight 418, car frame 420), and group node 406. Group node 406 includes tire 422 and group node 408. Group node 408 includes hub 424 and lug nuts 426.

Gesture Recognition

Figure 5A:
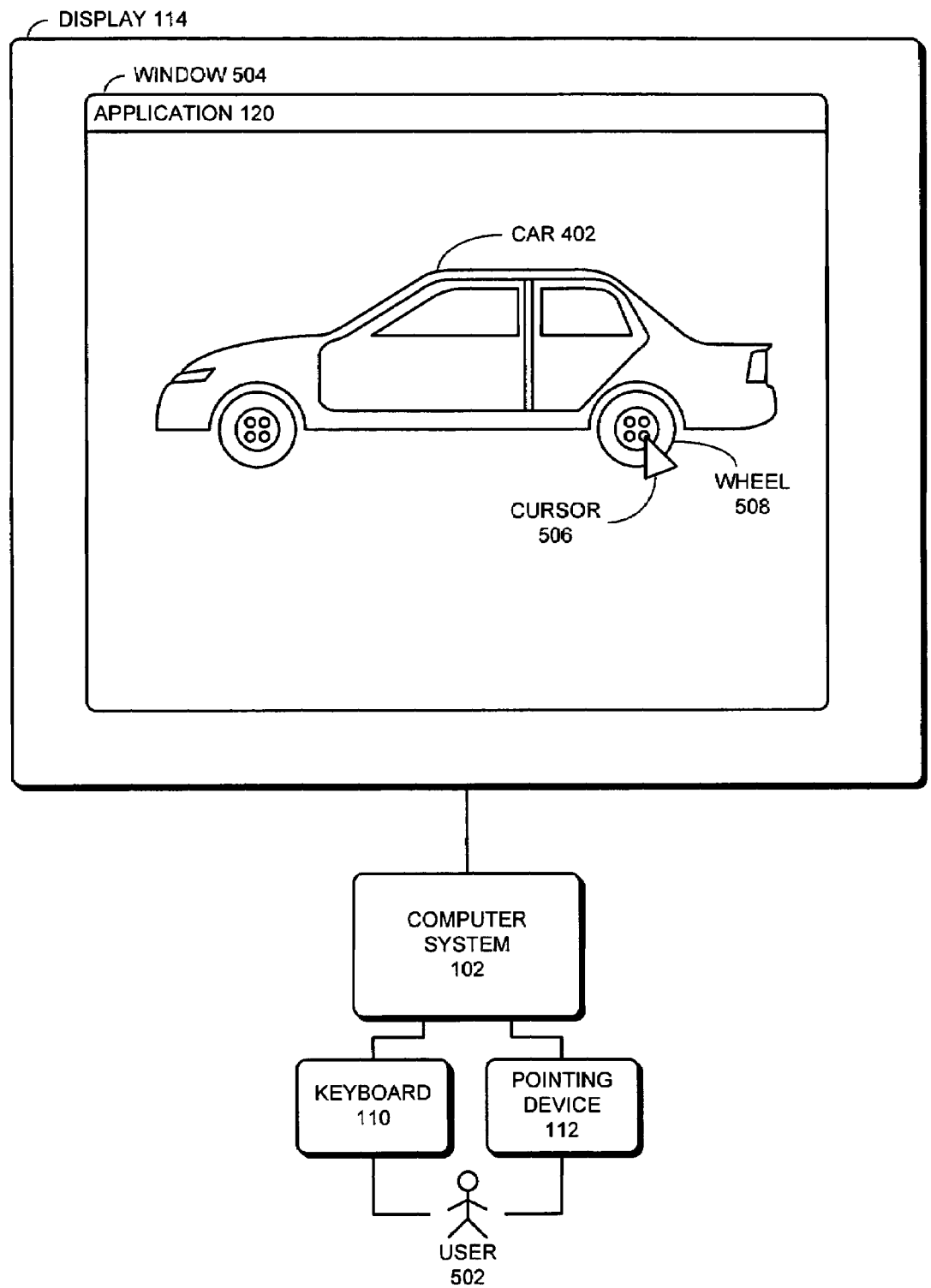
FIG. 5A illustrates an exemplary user interface which displays an object in accordance with an embodiment of the present invention.

FIG. 5A illustrates an exemplary user interface which displays an object in accordance with an embodiment of the present invention. Computer 102 displays a model of car 402 to user 502 in window 504 within display 114, wherein window 504 contains the visual portions of application 120. In one embodiment of the present invention, car 402 is represented by a sub-tree of the scene graph for the user interface. In another embodiment of the present invention, car 402 contains multiple sub-objects, wherein the sub-objects are represented by branches or by leaf nodes of the sub-tree of the scene graph.

In FIG. 5A, the user uses pointing device 112 to place cursor 506 over wheel 508. In one embodiment of the present invention, the user initiates a drag of car 402 by "grabbing" wheel 508. Note that a grab operation can include, but is not limited to, using a pointing device to select wheel 508, and without releasing a button on the pointing device, moving the pointing device to cause wheel 508 to start to move.

In one embodiment of the present invention, when user 502 grabs wheel 508 and drags it across window 504, user interface interaction module 118 causes car 402 to move across window 504. In another embodiment of the present invention, when user 502 grabs wheel 508 and drags it across window 504, user interface interaction module 118 causes wheel 508 to be disengaged and to move across window 504.

In one embodiment of the present invention, when user 502 grabs wheel 508 and moves wheel 508 in a specified motion, user interface interaction module 118 causes wheel 508 to be disengaged from car 402. In one embodiment of the present invention, the specified motion is a shaking of wheel 508. Note that the process of disengaging a sub-object from an object is described in more detail in reference to FIGS. 7A and 7B below.

In one embodiment of the present invention, user 502 does not use keyboard 110 when disengaging sub-objects from a selected object.

Figure 5B:
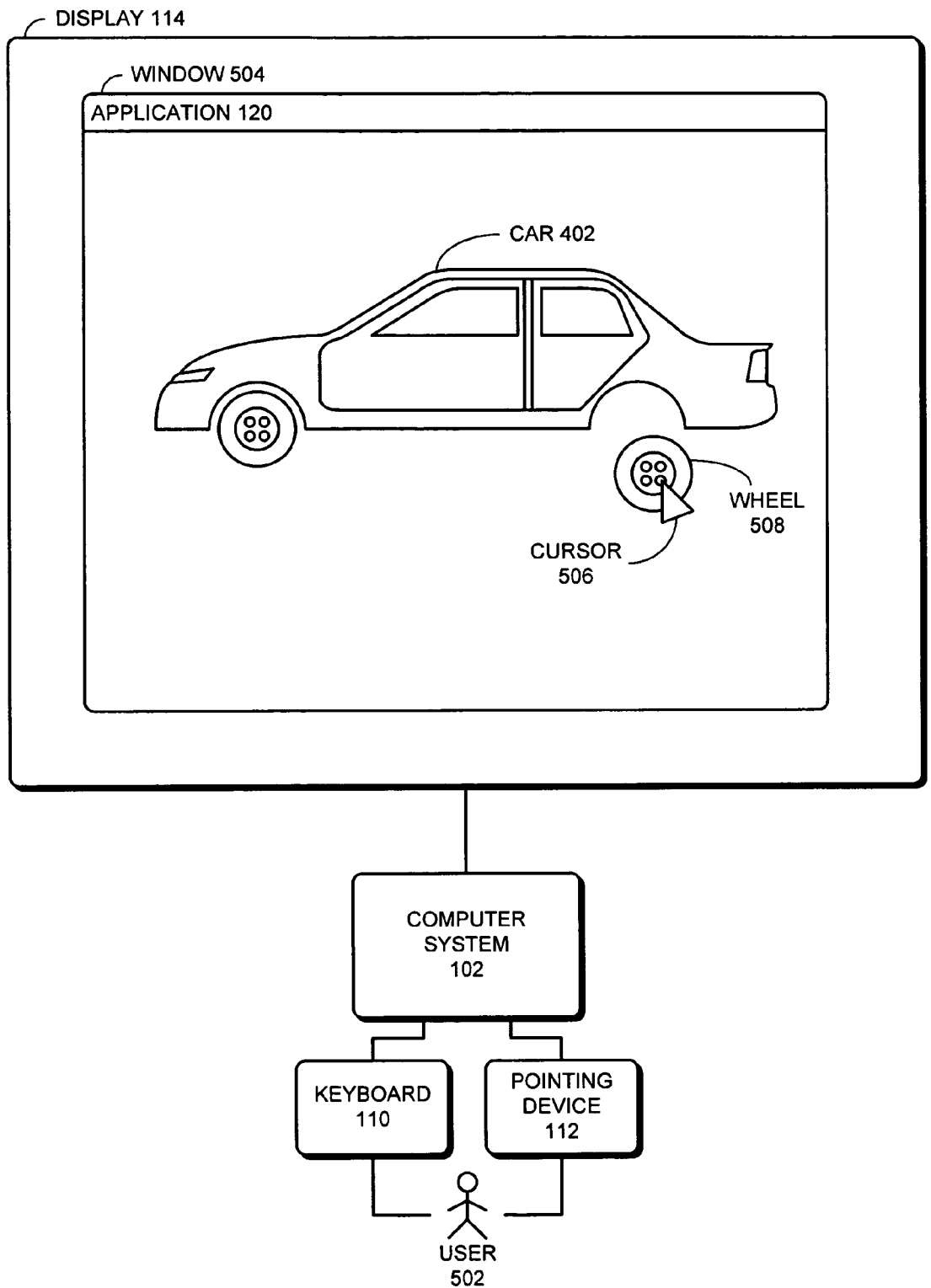
FIG. 5B illustrates the exemplary user interface in FIG. 5A after the user has disengaged a first sub-object from the object in accordance with an embodiment of the present invention.

In one embodiment of the present invention, user 502 disengages wheel 508 from car 402 by moving wheel 508 in a specified motion. The result of this operation is illustrated in FIG. 5B.

Figure 5C:
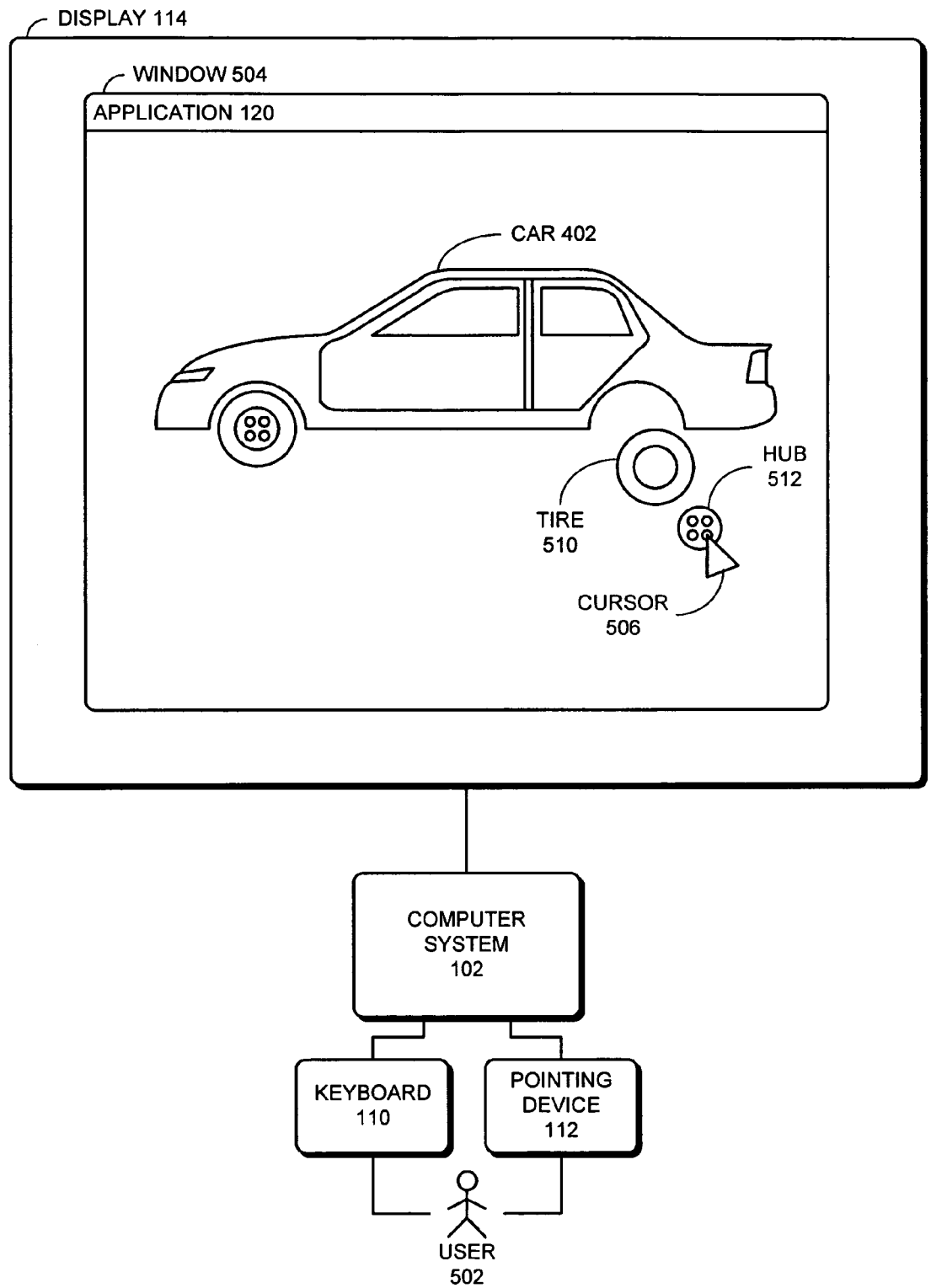
FIG. 5C illustrates the exemplary user interface in FIG. 5B after the user has disengaged a second sub-object from the first sub-object in accordance with an embodiment of the present invention.

In one embodiment of the present invention, user 502 disengages hub 512 from wheel 508 by moving wheel 508 in a specified motion. The result of this operation is illustrated in FIG. 5C.

Figure 5D:
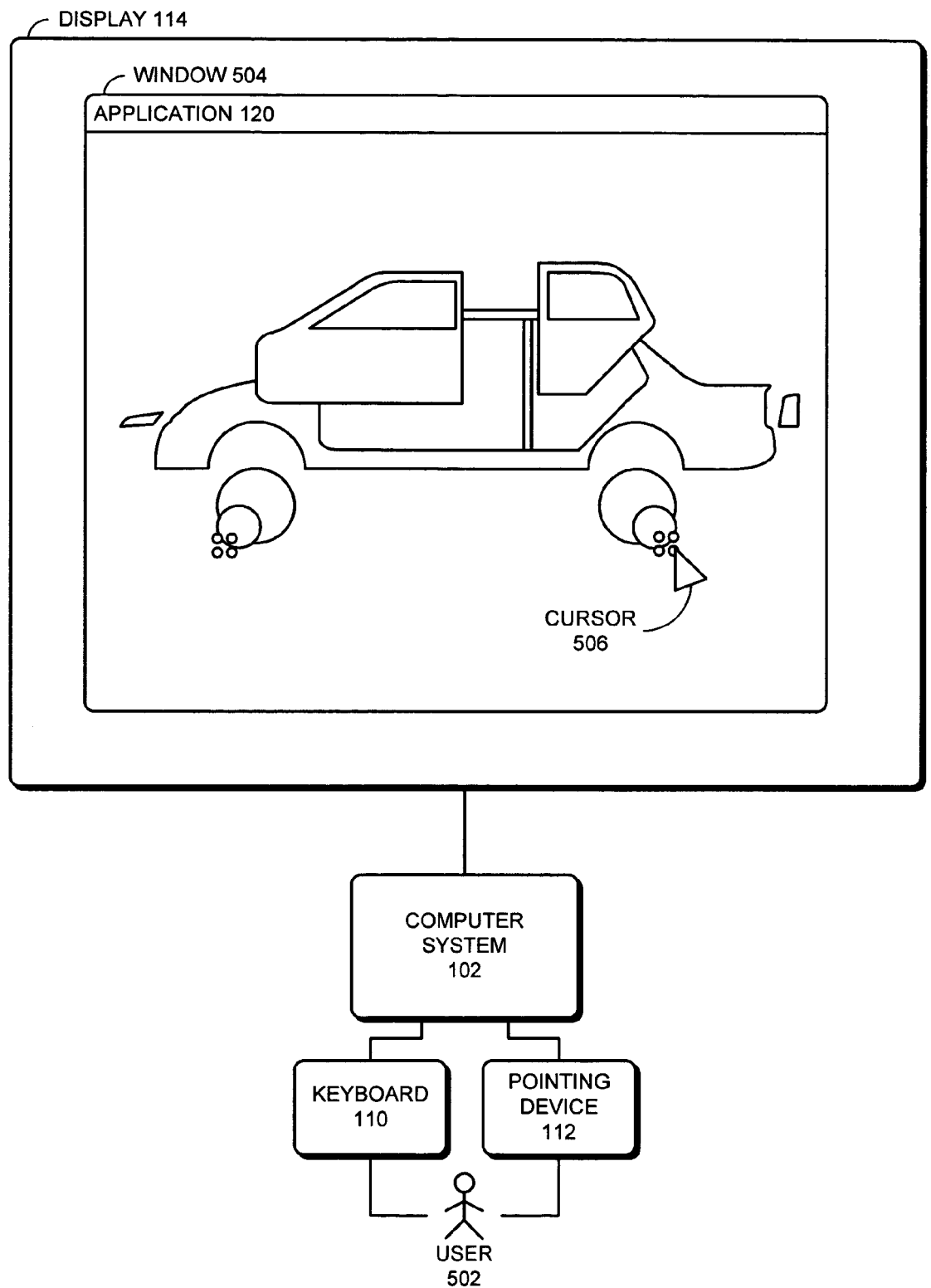
FIG. 5D illustrates an exemplary user interface in FIG. 5A after the user has disengaged all sub-objects from the object in accordance with an embodiment of the present invention.

In one embodiment of the present invention, if user 502 performs the specified motion a specified number of times, all sub-object that can be disengaged from the object are disengaged from the object. The result of this operation is illustrated in FIG. 5D. In one embodiment of the present invention, all sub-objects are disengaged from the object by shaking the selected object at a specified intensity.

In one embodiment of the present invention, if user 502 grabs a first object within the user interface and moves the first object in a specified motion, the sequence in which the sub-objects are disengaged from the object can be different than the sequence in which the sub-objects are disengaged if user 502 grabs another point on the first object. For example, if instead of grabbing wheel 508, user 502 grabs a door on car 402 and moves the door in a specified motion, the sequence of sub-objects that are disengaged each time the specified motion is performed can be: (1) the door, (2) the window, and (3) the door handle. This is in contrast to the sequence of sub-objects that are disengaged when the user performs the specified motion while grabbing wheel 508 (e.g., wheel, tire, hub, lug nuts).

Releasing Objects

In one embodiment of the present invention, if user 502 releases the selected object, all disengaged objects return to their previous positions relative to the selected object. For example, if user 502 selects wheel 508 and disengages all sub-objects for car 402, when user 502 releases wheel 508, all disengaged sub-objects of car 402 return to their natural resting position relative to car 402.

In one embodiment of the present invention, the mesh on which a disengaged sub-object is situated is coupled to a resting point on a parent object for the disengaged sub-object using a physics model. When the user releases the disengaged sub-object, the physics model returns the disengaged sub-object back to the resting point on the parent object. In one embodiment of the present invention, the physics model is a spring-damper model. In another embodiment of the present invention, the physics model is a gravity model.

In one embodiment of the present invention, if the disengaged sub-object is pulled a specified distance from a natural resting point for the disengaged sub-object, the physics model does not produce a restoring force on the disengaged sub-object. However, once the user moves the disengaged sub-object within a specified distance from a point on an object that can receive the disengaged sub-object, the physics model starts generating a force on the disengaged sub-object, pulling the disengaged sub-object toward the point on the object that can receive the disengaged sub-object.

In one embodiment of the present invention, if user 502 drops a disengaged sub-object onto a second object which can receive the disengaged sub-object, the disengaged sub-object is incorporated into the second object.

Figure 6A:
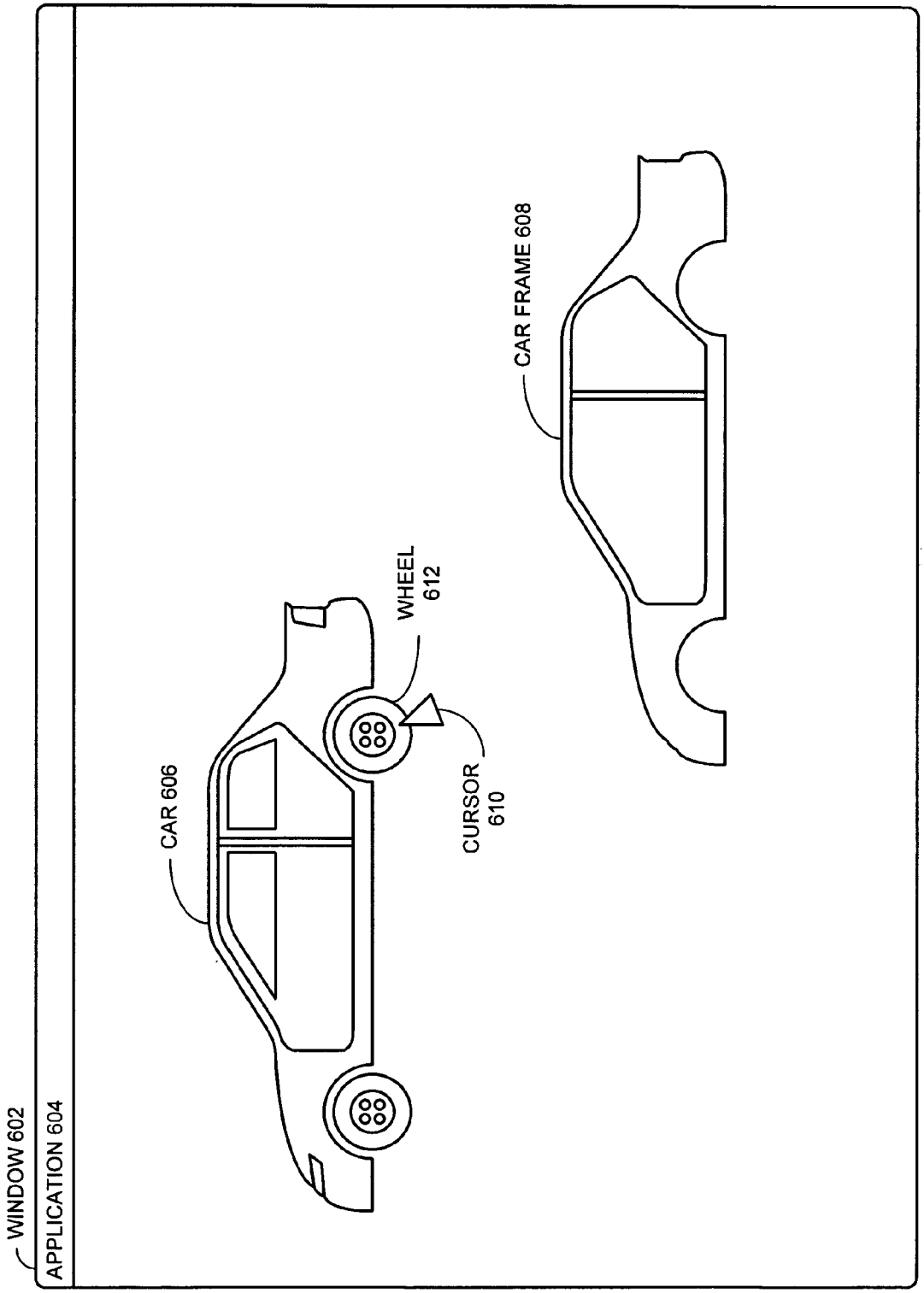
FIG. 6A presents an exemplary window within a user interface which includes two objects in accordance with an embodiment of the present invention.

FIG. 6A presents an exemplary window 602 within a user interface which includes two objects in accordance with an embodiment of the present invention. Window 602 contains the visual portions of application 604. In this example, window 602 contains car 606 and car frame 608. As illustrated, a user places cursor 610 onto wheel 612 for car 606. The user then performs a specified motion to disengage wheel 612 from car 606.

Next, the user moves the disengaged wheel 612 towards car frame 608. The result of this operation is illustrated in FIG. 6B.

In one embodiment of the present invention, when the user moves a disengaged sub-object within a specified distance from a point in an object that can receive the disengaged sub-object or within a specified area in an object that can receive the disengaged sub-object, user interface interaction module 118 generates an indication that the disengaged sub-object can be dropped onto the point in the object. In one embodiment of the present invention, user interface interaction module 118 causes the disengaged sub-object to be warped toward the point in the object that can receive the disengaged sub-object. In another embodiment of the present invention, other visual indications are applied to the disengaged sub-object and/or the object to indicate that the object can receive the disengaged sub-object. In this embodiment, the visual indications can include: a warping of the disengaged sub-object toward the specified area in the object that can receive the disengaged sub-object, a warping of the specified area in the object toward the disengaged sub-object, a slight movement of the disengaged sub-object toward the specified area, a slight movement of the specified area toward the disengaged sub-object, a highlighting of the disengaged sub-object, and a highlighting of the specified area. In another embodiment of the present invention, if the disengaged sub-object is not within a specified distance from a point of an object that can receive the disengaged sub-object, user interface interaction module 118 does not generate an indication that the disengaged sub-object can be dropped onto the object.

Figure 6B:
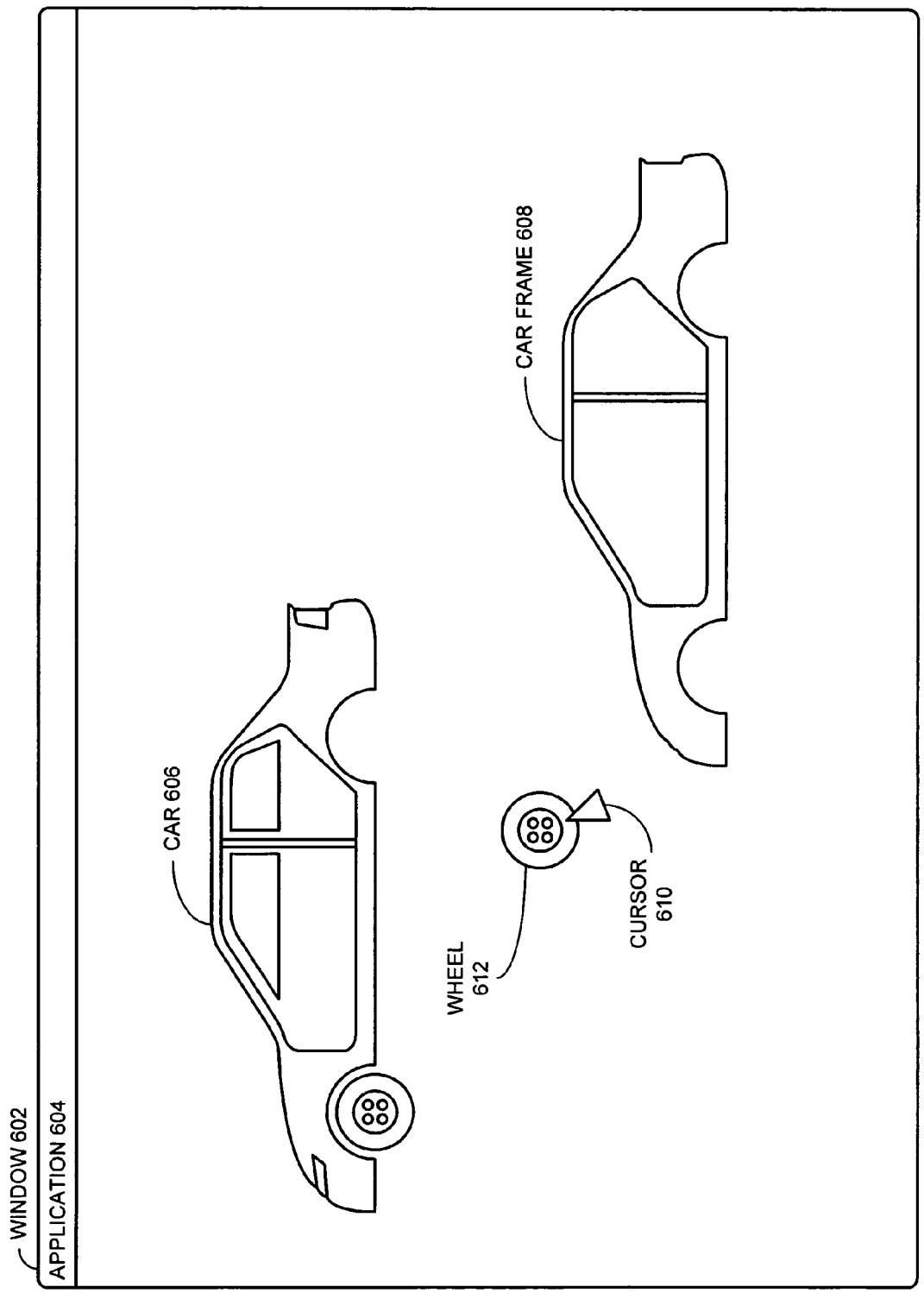
FIG. 6B presents the exemplary window of FIG. 6A after a user has disengaged a sub-object from a first object in accordance with an embodiment of the present invention.
Figure 6C:
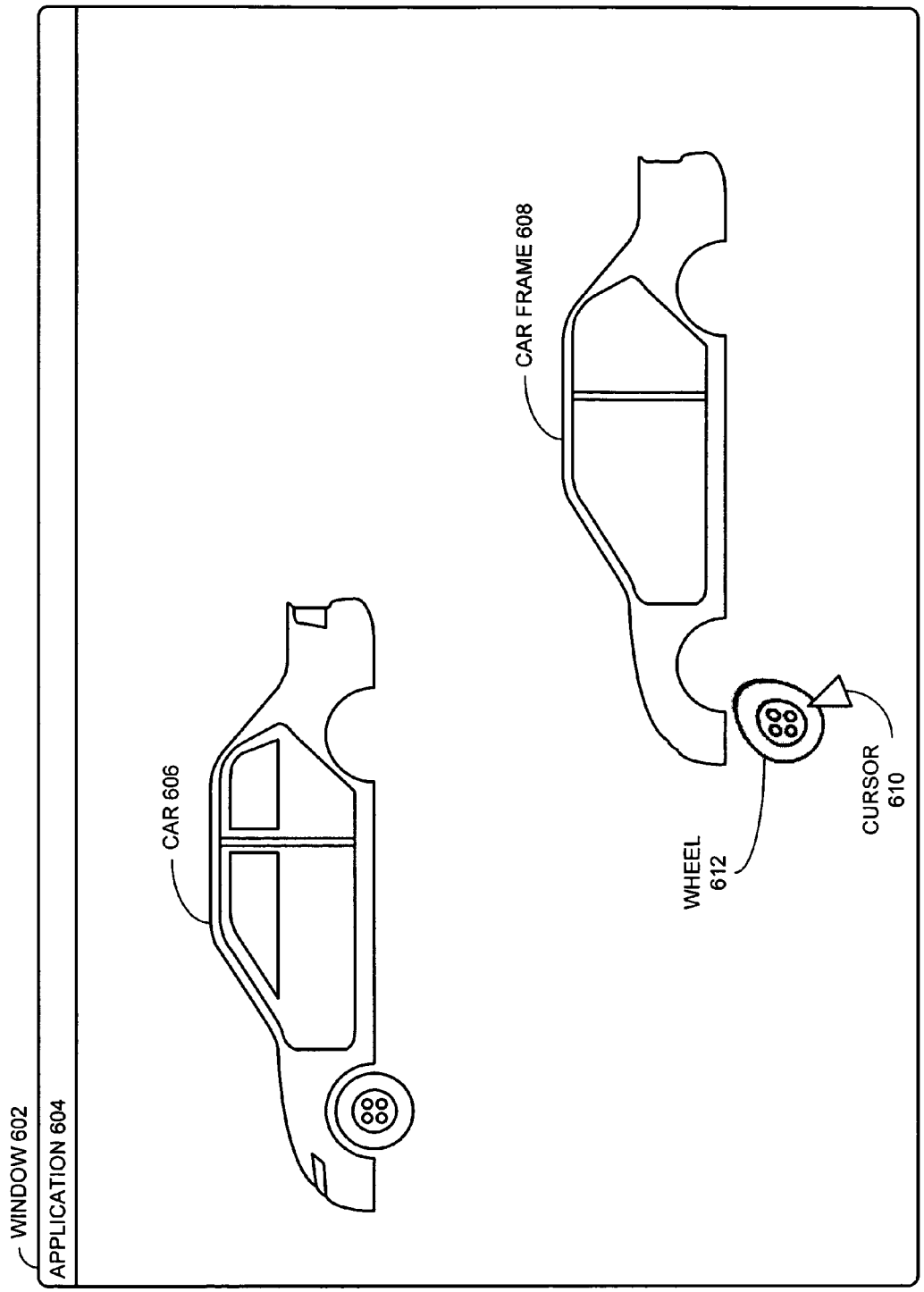
FIG. 6C presents the exemplary window of FIG. 6B after the user has moved the disengaged sub-object within a specified distance from the second object in accordance with an embodiment of the present invention.

FIG. 6C presents the exemplary window 602 of FIG. 6B after the user has moved wheel 612 within a specified distance from car frame 608 in accordance with an embodiment of the present invention. As illustrated in FIG. 6C, user interface interaction module 118 warps wheel 612 toward the front wheel well of car frame 608, thereby indicating that wheel 612 can be dropped into the front wheel well of car frame 608.

One embodiment of the present invention uses a physics model to warp the mesh on which the disengaged sub-object is situated. Note that warping the mesh on which the disengaged sub-object is situated causes the user interface to display a warped version of the disengaged sub-object. In one embodiment of the present invention, a gravity model is used to warp the mesh for the disengaged sub-object. In another embodiment of the present invention, if a user releases a first object while the first object is warped toward a second object, the gravity model causes the first object to be dropped onto the second object. Note that the gravity model can be replaced with any physics model that can produce a warping of the first object toward the second object (e.g., a spring-damper model).

Figure 6D:
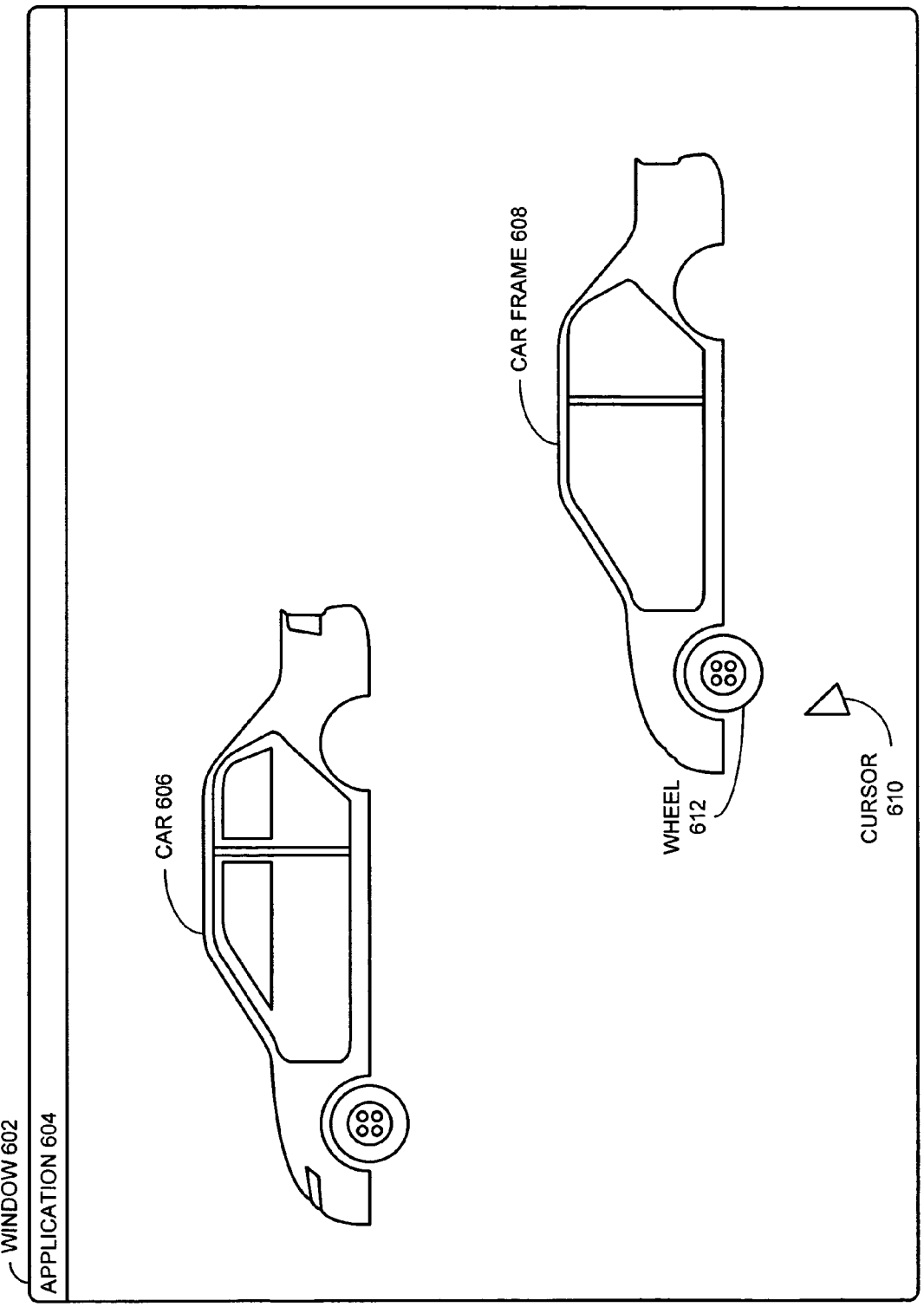
FIG. 6D presents the exemplary window of FIG. 6C after the user has released the disengaged sub-object in accordance with an embodiment of the present invention.

FIG. 6D presents the exemplary window 602 of FIG. 6C after the user has released wheel 612 onto car frame 608 in accordance with an embodiment of the present invention.

In one embodiment of the present invention, if the user releases wheel 612 within a specified distance from a point on car frame 608 that cannot receive wheel 612 or at a point far from an object that can receive wheel 612, wheel 612 remains at the position within window 602 at which the user released wheel 612. In another embodiment of the present invention, if the user releases wheel 612 within a specified distance from a point on car frame 608 that cannot receive wheel 612 or at a point far from an object that can receive wheel 612, wheel 612 returns to a previous position relative to car 606. In the example illustrated in FIG. 6B, wheel 612 returns to the rear wheel well of car 602.

Note that the drag-and-drop mechanism described in FIGS. 6A-6D can be applied to any user interface now known or later developed. For example, the drag-and-drop mechanism of the present invention can be applied to the user interface of an email application. If a user wants to add the email addresses contained in an email message sent to the user, the user can grab the email message icon that represents the email message and move the email message icon toward a contact list icon. As the user moves the email message toward the contact list icon, the user interface interaction module can cause the email message icon to warp toward objects in the user interface which can receive the email message icon.

For example, as the user drags the email message icon across the user interface, the user can pass several objects within the user interface, including a printer icon, a trash can icon, a fax machine icon, and an icon for a game. As the email message icon passes within a specified distance of the printer icon, the email message icon warps toward the printer icon, indicating that the user can drop the email message onto the printer to print the email message. As the email message icon passes within a specified distance of the trash can icon, the email message icon warps toward the trash can icon, indicating that the user can drop the email message onto the trash can to delete the email message. As the email message icon passes within a specified distance of the fax machine icon, the email message icon warps toward the fax machine icon, indicating that the user can drop the email message onto the fax machine to send a facsimile of the message. As the email message icon passes within a specified distance of the game icon, the email message icon does not warp toward the game icon, indicating that the email message cannot be dropped onto the game. As the email message icon approaches within a specified distance of the contact list icon, the email message icon warps toward the contact list icon, indicating that the email message can be dropped onto the contact list, extracting the necessary contact information for the sender.

The above-described warping mechanism is useful because a typical user interface does not provide feedback as to whether a first object in the user interface can accept a dragged object until the dragged object is moved on top of the first object. This warping mechanism provides early feedback as to which objects within the user interface can accept a dragged object.

Disengaging Sub-Objects

Figure 7A:
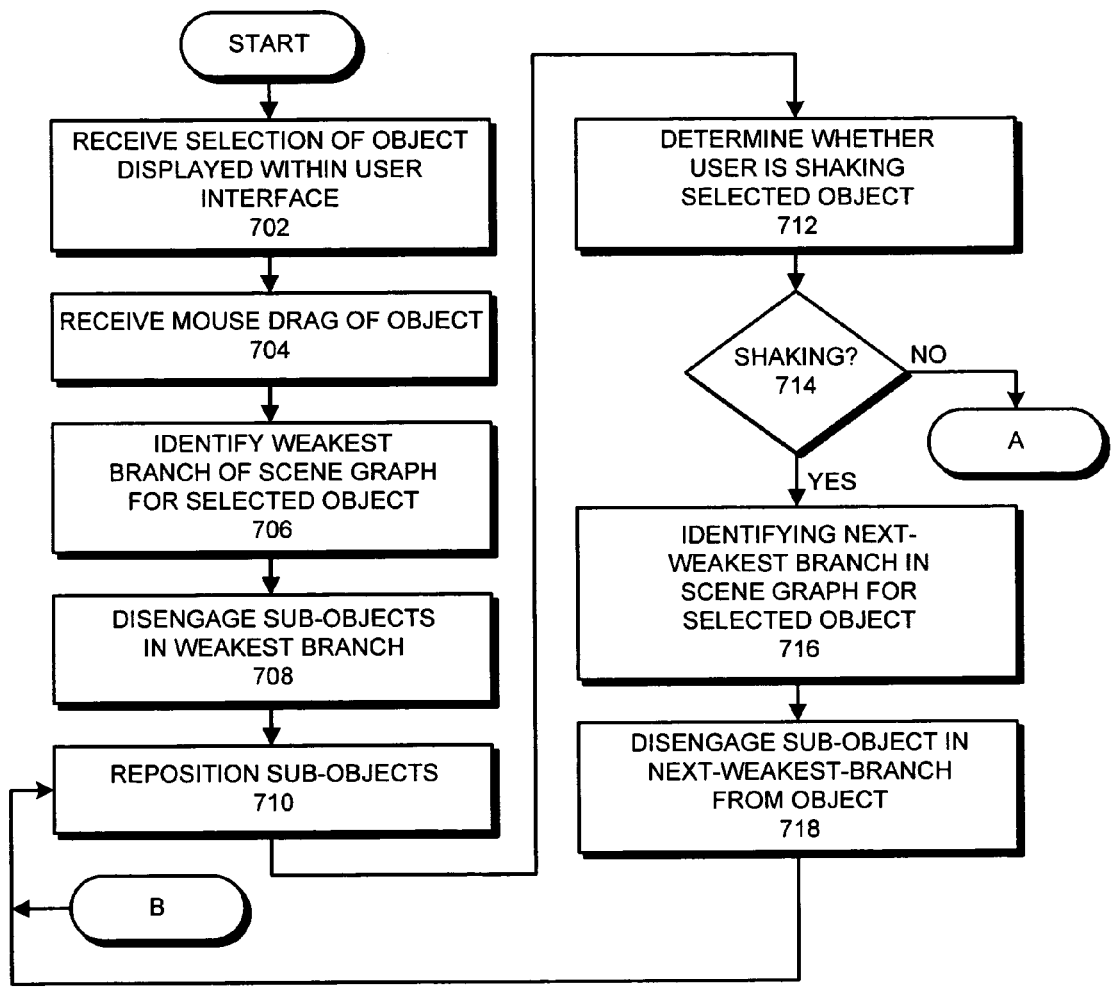
FIG. 7A presents a flow chart illustrating the process of interacting with objects in a user interface in accordance with an embodiment of the present invention.

FIG. 7A presents a flow chart illustrating the process of interacting with objects in a user interface in accordance with an embodiment of the present invention. The process begins when the system receives a selection of an object displayed within the user interface from a user, wherein the selected object contains a plurality of sub-objects (step 702). Next, the system receives an indication that the user is dragging the selected object within the user interface (step 704). The system then identifies a weakest branch of the sub-tree for the selected object, wherein the weakest branch is associated with a weakest link of the sub-tree (step 706).

Next, the system disengages the sub-objects in the weakest branch from the selected object (step 708). The system then repositions the sub-objects in the weakest branch to a position within the user interface specified by the user (step 710).

Next, the system determines whether the user is shaking the selected object (step 712). If so (step 714—yes), the system identifies a next-weakest branch of the sub-tree for the selected object, wherein the next-weakest branch is associated with a next-weakest link of the sub-tree (step 716). The system then disengages sub-objects in the next-weakest branch from the selected object (step 718) and returns to step 710.

Figure 7B:
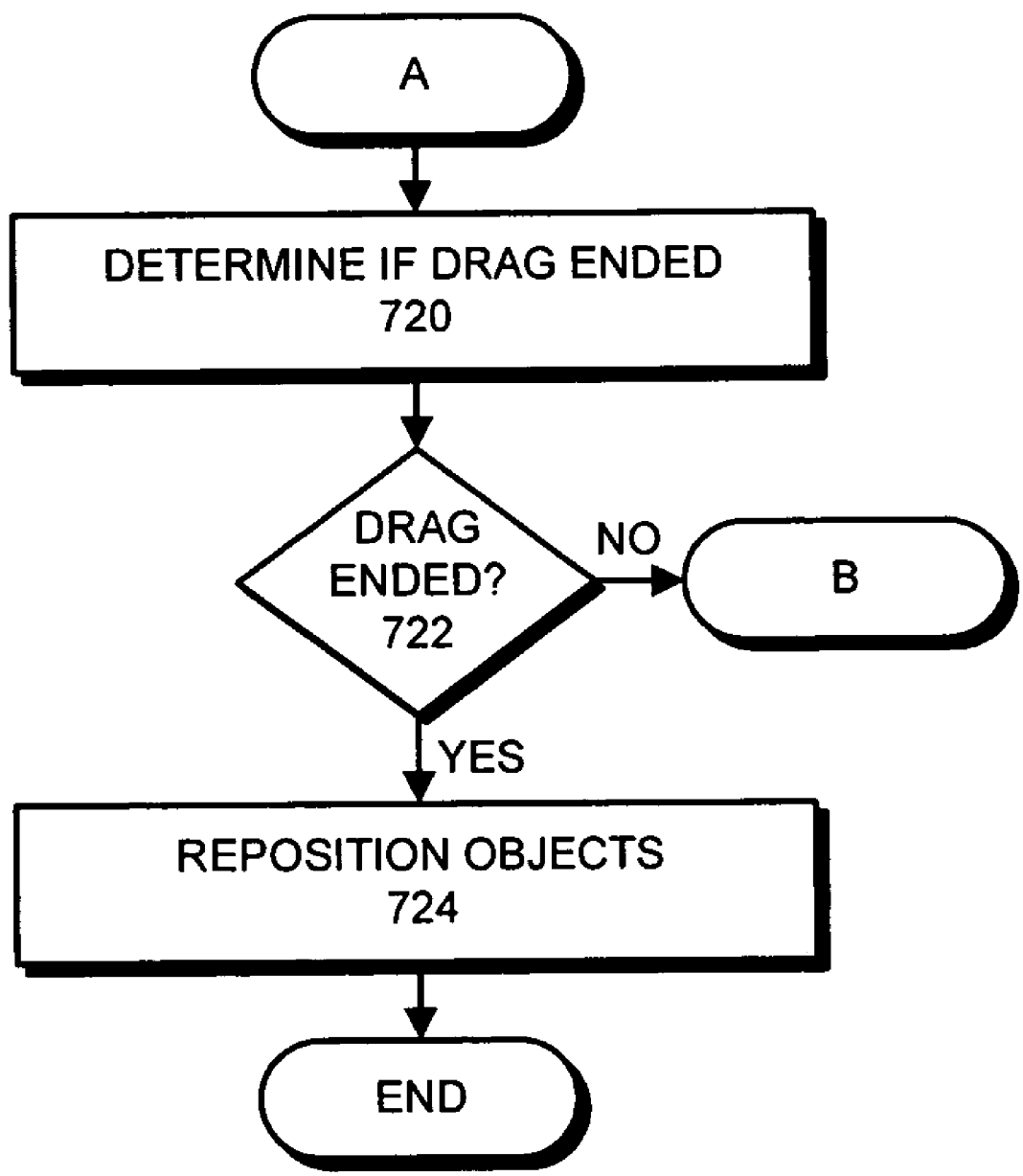
FIG. 7B presents a flow chart continuing the process illustrated in FIG. 7A in a user interface in accordance with an embodiment of the present invention.

If the user is not moving the selected object with a specified motion (step 714—no), the process continues to A on FIG. 7B.

FIG. 7B presents a flow chart continuing the process illustrated in FIG. 7A in a user interface in accordance with an embodiment of the present invention. The process begins at A when the system determines if the user has stopped dragging the selected object (step 720). If so (step 722—yes), the system repositions the sub-objects to a position specified by the user (step 724). Otherwise, the process continues at B in FIG. 7A.

Note that although the process described in FIGS. 7A and 7B refer to a shaking of the selected object, the process can also be applied to any specified motion which has an object-transformation operation associated with the motion.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for interacting with objects in a user interface of a computer system, comprising:
   receiving, at the computer system, a selection of an object displayed within the user interface from a user, wherein the selected object contains a plurality of sub objects, wherein the selected object is represented by a sub tree of a scene graph for the user interface, and wherein the sub objects of the selected object are represented by branches or leaf nodes of the sub tree, and wherein a link between two objects in the scene graph has a strength property which indicates the strength of the link between the two objects;
   in response to the selection, determining whether the user is moving the selected object with a specified motion; and
   in response to the user moving the selected object which is represented by the sub tree of the scene graph, performing a transformation on the selected object, wherein the transformation is associated with the specified motion, wherein performing the transformation on the select object involves identifying a weakest branch of the sub tree for the selected object, and wherein the weakest branch is associated with a weakest link of the sub tree;
   wherein if the specified motion involves shaking the selected object or dragging the selected object, performing the transformation on the selected object involves disengaging sub objects in the weakest branch from the selected object.

2. The method of claim 1,
   wherein the strength property is determined by analyzing parameters and conditions of the two objects which the link is coupling; and
   wherein the parameters and the conditions can include:
   a parent child relationship;
   the distance from the root of the scene graph;
   the size of the sub tree; and
   mass parameters associated with the related sub trees.

3. The method of claim 1, wherein each time the selected object is shaken, the method further comprises disengaging sub objects in the next weakest branch of the sub tree.

4. The method of claim 1, wherein disengaging a given sub object involves moving the given sub object away from the selected object within the user interface.

5. The method of claim 4,
   wherein if the given sub object is moved within a specified distance from a second object or within a specified area in the second object which can receive the given sub object, a visual indication is applied to the given sub object and/or the second object which indicates that the given sub object can be dropped onto the second object; and
   wherein the visual indication includes:
   a warping of the given sub-object toward the specified area in the second object that can receive the given sub-object;
   a warping of the specified area in the second object toward the given sub object;
   a slight movement of the given sub object toward the specified area;
   a slight movement of the specified area toward the given sub object;
   a highlighting of the given sub-object; and
   a highlighting of the specified area.

6. The method of claim 1, wherein if the user releases the selected object, the disengaged sub objects return to previous positions relative to the selected object.

7. The method of claim 1, wherein if the user drops a disengaged sub object onto a second object which can receive the disengaged sub object, the disengaged sub object is incorporated into the second object.

8. The method of claim 1, wherein if the specified motion involves dragging the selected object, performing the transformation on the selected object further involves:
   moving the sub objects in the weakest branch to a position within the user interface specified by the user.

9. A computer readable storage medium storing instructions that when executed by a computer cause the computer to perform a method for interacting with objects in a user interface of a computer system, wherein the method comprises:
   receiving, at the computer system, a selection of an object displayed within the user interface from a user, wherein the selected object contains a plurality of sub objects, wherein the selected object is represented by a sub tree of a scene graph for the user interface, and wherein the sub objects of the selected object are represented by branches or leaf nodes of the sub tree, and wherein a link between two objects in the scene graph has a strength property which indicates the strength of the link between the two objects;
   in response to the selection, determining whether the user is moving the selected object with a specified motion; and
   in response to the user moving the selected object which is represented by the sub tree of the scene graph, performing a transformation on the selected object, wherein the transformation is associated with the specified motion, wherein performing the transformation on the select object involves identifying a weakest branch of the sub tree for the selected object, and wherein the weakest branch is associated with a weakest link of the sub tree;
   wherein if the specified motion involves shaking the selected object or dragging the selected object, performing the transformation on the selected object involves disengaging sub objects in the weakest branch from the selected object.

10. The computer readable storage medium of claim 9,
    wherein the strength property is determined by analyzing parameters and conditions of the two objects which the link is coupling; and
    wherein the parameters and the conditions can include:
    a parent child relationship;
    the distance from the root of the scene graph;
    the size of the sub tree; and
    mass parameters associated with the related sub trees.

11. The computer readable storage medium of claim 9, wherein each time the selected object is shaken, the method further comprises disengaging sub objects in the next weakest branch of the sub tree.

12. The computer readable storage medium of claim 9, wherein disengaging a given sub object involves moving the given sub object away from the selected object within the user interface.

13. The computer readable storage medium of claim 12,
   wherein if the given sub object is moved within a specified distance from a second object or within a specified area in the second object which can receive the given sub object, a visual indication is applied to the given sub object and/or the second object which indicates that the given sub object can be dropped onto the second object; and
   wherein the visual indication includes:
   a warping of the given sub-object toward the specified area in the second object that can receive the given sub-object;
   a warping of the specified area in the second object toward the given sub object;
   a slight movement of the given sub object toward the specified area;
   a slight movement of the specified area toward the given sub object;
   a highlighting of the given sub-object; and
   a highlighting of the specified area.

14. The computer readable storage medium of claim 9, wherein if the user releases the selected object, the disengaged sub objects return to previous positions relative to the selected object.

15. The computer readable storage medium of claim 9, wherein if the user drops a disengaged sub object onto a second object which can receive the disengaged sub object, the disengaged sub object is incorporated into the second object.

16. The computer readable storage medium of claim 9, wherein if the specified motion involves dragging the selected object, performing the transformation on the selected object further involves:
   moving the sub objects in the weakest branch to a position within the user interface specified by the user.

17. An apparatus that interacts with objects in a user interface of a computer system, comprising:
   a processor;
   a user interface interaction mechanism configured to:
   receive a selection of an object displayed within the user interface from a user, wherein the selected object contains a plurality of sub objects, wherein the selected object is represented by a sub tree of a scene graph for the user interface, and wherein the sub objects of the selected object are represented by branches or leaf nodes of the sub tree, and wherein a link between two objects in the scene graph has a strength property which indicates the strength of the link between the two objects;
   in response to the selection, to determine whether the user is moving the selected object with a specified motion; and
   in response to the user moving the selected object which is represented by the sub tree of the scene graph, to perform a transformation on the selected object, wherein the transformation is associated with the specified motion, wherein performing the transformation on the select object involves identifying a weakest branch of the sub tree for the selected object, and wherein the weakest branch is associated with a weakest link of the sub tree;
   wherein if the specified motion involves shaking the selected object or dragging the selected object, performing the transformation on the selected object involves disengaging sub objects in the weakest branch from the selected object.

* * * * *